United States Patent [19]

Belka

[11] Patent Number: 4,759,481

[45] Date of Patent: Jul. 26, 1988

[54] CYCLE LAMP AND ATTACHMENT THEREFOR

[75] Inventor: Heinrich Belka, Bielefeld, Fed. Rep. of Germany

[73] Assignee: ESGE-Marby GmbH & Co. KG, Bielefeld, Fed. Rep. of Germany

[21] Appl. No.: 868,093

[22] Filed: May 28, 1986

[30] Foreign Application Priority Data

Jun. 5, 1985 [DE] Fed. Rep. of Germany ....... 3520237

[51] Int. Cl.[4] .............................................. B62J 7/00
[52] U.S. Cl. ...................................... 224/39; 362/72; 403/305; 411/92; 411/177
[58] Field of Search ..................... 224/30 R, 30 A, 35, 224/36, 39, 41; 411/89, 92, 177; 280/289 A, 289 H; D26/28, 34; 362/72; 403/305

[56] References Cited

U.S. PATENT DOCUMENTS

| | | | |
|---|---|---|---|
| 1,056,574 | 3/1913 | Newton | 362/72 |
| 1,237,056 | 8/1917 | Kitchen | 403/305 |
| 1,735,212 | 11/1929 | Pawsat | 224/41 |
| 4,436,350 | 3/1984 | Jolin | 224/41 |

*Primary Examiner*—Henry J. Recla
*Assistant Examiner*—David Voorhees
*Attorney, Agent, or Firm*—Frishauf, Holtz, Goodman & Woodward

[57] ABSTRACT

A mounting apparatus for a cycle headlamp, particularly for a bicycle headlamp, features a mounting bracket (13) which can clamp onto a horizontally disposed strut of the cycle frame or of a cycle accessory, such as a baggage carrier.

The cycle headlamp has a reflector housing (9) which is rotatably coupled to the upper end of the mounting bracket (13). The lower end (14) of the mounting bracket is bifurcated into upper (15) and lower (16) legs or jaws, which define a bight or maw (18) having an interior clamping surface (17) which is preferably half-cylindrical but may also be polygonal. A further clamping element (24, 25) is supported by the jaws (15, 16) and presses the strut (7) between itself and the clamping surface (17). This mounting is very secure and resists twisting torques. Preferably, the clamping element includes a frusto-conical nut (25) which rides in a smooth bore (22) in one jaw (15) and is threaded onto a countersunk screw (24) mounted in a correspondingly shaped bore (23) in the other jaw (16).

11 Claims, 2 Drawing Sheets

CYCLE LAMP AND ATTACHMENT THEREFOR

The present invention relates generally to lamps for bicycles, motorcycles, and the like, and more particularly to adjustable mounting means for such lamps.

BACKGROUND

Conventional bicycle lamps are known, which have sheet-metal fastening elements, the strut-attaching end of which is clamshell-shaped. The two shells are positioned on respective sides of the strut and tensioned with respect to each other by interpenetrating clamping screws. Due to their method of manufacture, the shells have on their edges a burr or ridge which, upon clamping of the element, bites into the paint of the strut and destroys it. Corrosion of the strut from this point onward is the inevitable result.

Despite its bite, this construction doesn't offer any significant degree of resistance to torque acting around the longitudinal axis of the strut supporting it; rather, the lamp and mounting tends to twist around the strut. Therefore, this structure is totally unsuited for mounting on horizontal struts. Further, it also works poorly on small-diameter struts.

Another conventional construction wraps a strap around the handlebars like a bandage and is tensioned with a single securing screw next to the handlebar. This avoids the problem of damaging the plating or paint of the handlebar, but also offers no significant resistance to twisting torques. Generally, it also requires that one end of the strut or bar be freely accessible, so that a continuous strap loop can be slipped over the end.

THE INVENTION

Accordingly, it is an object of the present invention to provide a mounting means which is simple to make and attach, which secures even to small-diameter struts, and which can withstand substantial twisting torques, enabling use on horizontally disposed struts.

Briefly, the mounting apparatus has a bracket with a bifurcated end, including two jaws which slip over respective sides of the strut, a clamping surface between the jaws which engages the front of the strut, and an additional clamping element, supported by the jaws, which engages the back side of the strut. The additional clamping element is not secured until after the strut is between the jaws, so access to a free end of the strut is not required.

If the bifurcated end or bight or maw of the mounting bracket has a U-shaped cross-section, the inner faces of the jaws will be substantially flat and the clamping surface will be half-cylindrical, creating a large contact area between the maw and the strut which not only resists "roll" torques around an axis *perpendicular* to the longitudinal axis of the strut, but also provides excellent resistance to "pitch" torques *around* the longitudinal axis of the strut. This results from the frictional hold provided by the large contact area. Good results are obtained even when the strut is exactly cylindrical.

The mounting means of the invention allows mounting the lamp on a horizontal strut of a front or back pack support frame for a cycle.

In order to reduce or spread out the bending load placed on the strut, the breadth, along the strut, of the bight or maw is greater than the width between the jaws.

The clamping element can be anchored very simply if the jaws are provided with holes. Preferably, each jaw has a respective hole through it, which is coaxial with the other hole, and one of the holes has smoothly cylindrical walls. A wedge-shaped nut slides in the smooth-walled hole and is threaded onto a countersunk screw which is seated in a hole in the other jaw, thereby clamping the strut between the wedge-shaped nut and the clamping surface. The wedge-shaped surface can be a planar surface, which minimizes the load on the strut surface, but drives up the cost of the nut.

However, preferably the wedge-shaped nut has a frusto-conical portion and has a cylindrical extension at the large end of the frusto-conical portion. This structure has the advantage that, when the nut is tightened onto the screw, a slight deformation of the nut and the strut occur at the point of contact, which does not damage the surface of the strut but does further increase the resistance of the mounting to torques acting around the longitudinal axis of the strut.

In any case, the cross-section of the nut and the cross-section of the smooth-walled hole are matched to facilitate satisfactory contact.

The mounting bracket can be simply and economically produced by using a correspondingly shaped extrusion die. Preferably, the bracket is made of a light metal such as aluminum alloy, and the clamping element of stainless steel.

In order to increase the range of fastening possibilities of the cycle lamp and to permit, selectively, mounting on either a vertical or a horizontal strut, the end of the mounting bracket nearest the lamp housing has two holes, at right angles to each other, for the screw which fastened the housing to the bracket. Each hole is surrounded by a flat surface, perpendicular to the axis of the hole, for abutment with the flange or joint bar extending from the housing.

DRAWINGS

DETAILED DESCRIPTION

Figure 1:
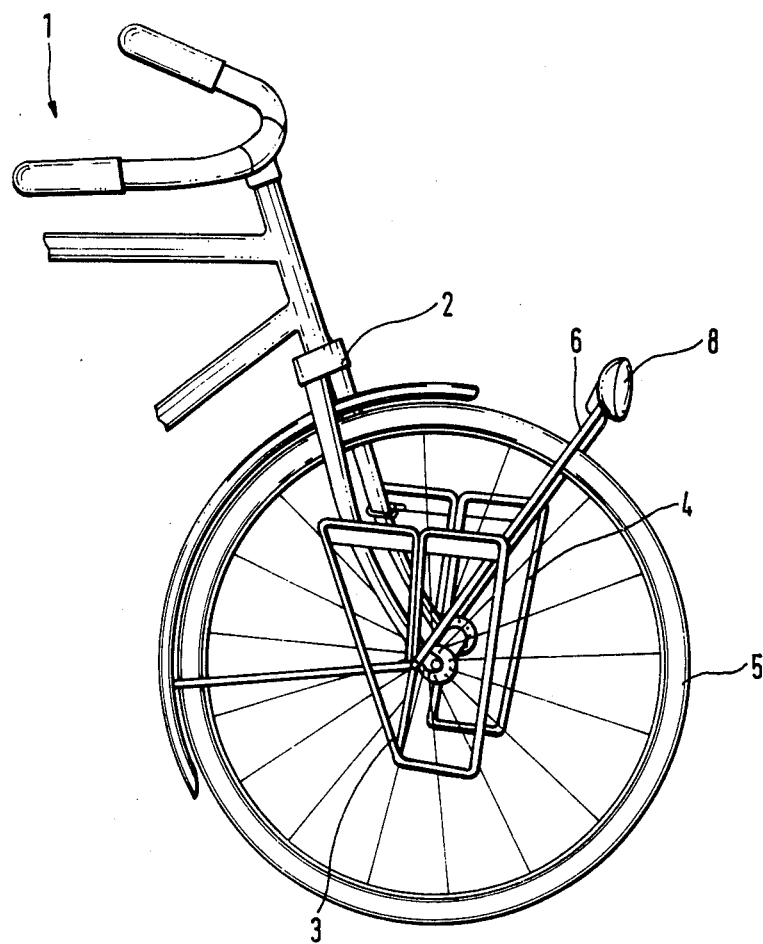
FIG. 1 is a right-side perspective view of the headlamp and support strut mounting of the present invention, shown with side-mounted pack frames on the front wheel of a bicycle.

FIG. 1 schematically illustrates the front end of a bicycle 1, on whose front-wheel fork is mounted a pair of pack support frames 3, 4. The pack support frames are reinforced by a U-shaped shackle or support strut 6 having ends mounted on the front-wheel axle 5, and a configuration which loops around the front wheel, preferably at an angle about 30° forward of the vertical. The support strut 6 has a horizontally running central strut segment 7, preferably linear and parallel to the front-wheel axle 5, which serves for mounting of the headlamp 8.

Figure 2:
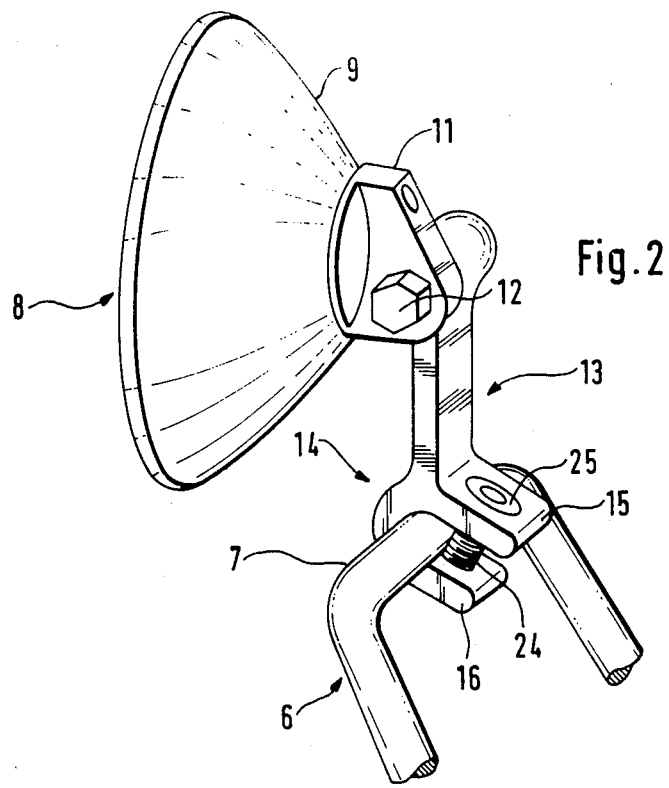
FIG. 2 is an enlarged left-rear perspective view of the headlamp and mounting of FIG. 1, with the support strut partially broken away.

FIG. 2 shows in greater detail how the headlamp 8 is mounted on the support strut 6. The headlamp 8 has a generally conical housing 9 which contains the bulb, reflector, and associated components. A fitting is screwed to the backside of the housing 9, preferably near the apex of the cone, and is integral with a generally vertically aligned joint bar 11. The joint bar 11 is fastened, in turn, with a generally horizontally oriented screw 12 to an elongated mounting bracket 13. The end of bracket 13 remote from the headlamp housing 9 is adapted for mounting on a strut of a bicycle frame or on a bicycle accessory part such as the reinforcing support strut 6. This housing-remote end 14 is bifurcated into two generally flattened legs or jaws 15, 16 which extend backward at an angle to the longitudinal axis of the bracket 13. These jaws 15, 16 define between them a bight or maw 18, including an interior clamping surface 17 which extends from one jaw to the other. As shown in FIG. 2, upper jaw 15 and lower jaw 16 extend over the horizontal strut segment 7, which is secured between them.

The maw 18 has a generally U-shaped cross-section. Jaws 15 and 16 have, on their respective opposing inner faces, generally flat surfaces 19 and 20, while the clamping surface 17 extending between them has a concave, half-cylindrical configuration. Of course, surface 17 could equally well have a polygonal configuration.

The spacing between parallel jaws 15 and 16, as shown by arrow 21, corresponds to the diameter of strut segment 7 onto which the mounting bracket 13 clamps. The extent of the jaws 15, 16, in the direction of the breadth of the bight or maw 18, i.e., with reference to FIG. 3, perpendicular to the paper, is preferably greater than the spacing or width 21 of the maw 18, in order to assure an attachment to strut segment 7 which is secure against twisting.

Each of the jaws 15, 16 has a respective hole or bore 22, 23, the bores being coaxial with one another. Bore 22 in upper jaw 15 has smoothly cylindrical walls, while bore 23 is partly cylindrical but becomes frusto-conical, on the side remote from maw 18, in order to receive the head of a countersunk screw 24.

Figure 3:
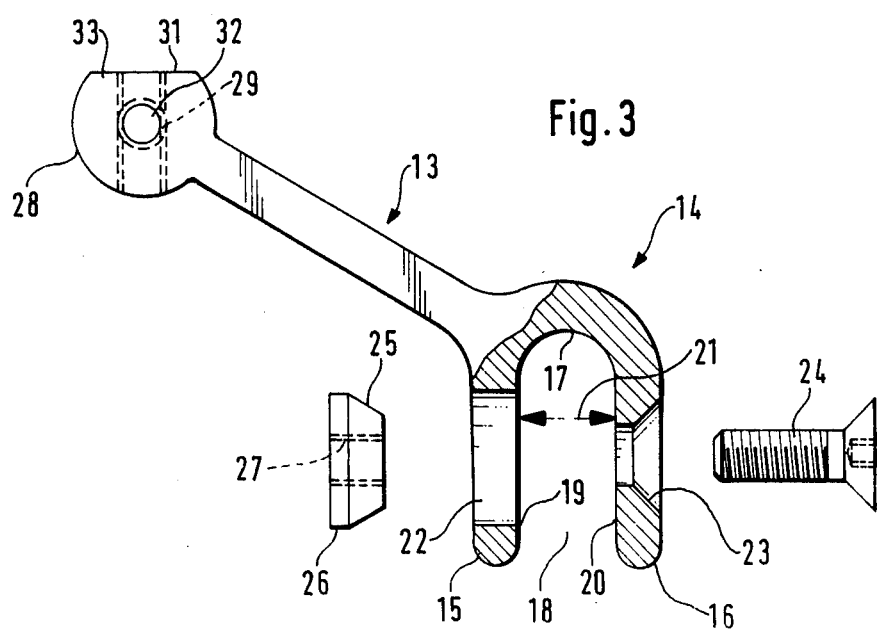
FIG. 3 is a further-enlarged right-side view, partially in section, of the bracket of the mounting of FIG. 2.

As shown in FIG. 3, the cylindrical bore 22 serves to receive a frusto-conical nut 25. At the wider end of the frustrum, nut 25 has a cylindrical extension 26 whose diameter matches the diameter of the cylindrical bore 22. Nut 25 is rotationally symmetrical, and has a coaxial threaded hole 27, into which the threaded shaft of countersunk screw 24 can be screwed.

At the end of bracket 13 remote from the maw 18 is integrally formed a torus 28 having a threaded hole 29 whose longitudinal axis is preferably parallel to the axis defined by the aforementioned half-cylindrical clamping surface 17. Each end of the threaded hole 29 is surrounded by a substantially planar abutment surface 31, extending perpendicular to the axis of hole 29, for placement against the joint bar 11.

In order to permit attachment of the joint bar 11 to the mounting bracket 13 in an attitude rotated 90° from the attachment which uses hole 29, a further threaded hole 32 is provided, which runs perpendicular to threaded hole 29. Hole 32 is also surrounded by a planar abutment surface 33 for placement of the joint bar 11.

Fastening of the cycle headlamp involves, first, attaching the joint bar 11, projecting from the housing 9, to mounting bracket 13 by threading bolt 12 through both of them. Depending upon the desired orientation, bolt 12 can be screwed into either threaded hole 29 or threaded hole 32. Next, the bracket 13, with its maw 18, is crammed over the corresponding strut, for example strut segment 7. Once this is done, frusto-conical nut 25 is slipped, point first, into bore 22 and countersunk screw 24 is introduced from the opposing side through bore 23 and screwed into threaded hole 27 of nut 25. Nut 25, with its cylindrical extension 26, is thereby radially introduced into bore 22, with very little play.

Upon tightening of screw 24, the one side of leading surface of the frusto-conical nut 25 presses on the surface of strut segment 7, while on the opposing side, cylindrical extension 26 is pressed laterally against the sidewall of bore 22, thereby frictionally resisting any tendency of nut 25 to turn with screw 24 instead of threading onto it.

Once screw 24 is screwed in, drawing frusto-conical nut 25 toward surface 20 of lower jaw 16, nut 25, with its cylindrical extension supported in bore 22, presses the strut segment 7 against the half-cylindrical clamping surface 17 in a direction substantially perpendicular to the axis of screw 24.

Depending upon the materials chosen for strut segment 7 and the frusto-conical nut 25, a slight deformation of the conical surface of nut 25, which acts as a wedge, and/or of the abutting portion of the surface of clamped strut segment 7, may occur.

The frusto-conical nut 25 is disposed in bore 22 with radial play, so the screwing together with screw 24 produces no bending of the jaws 15, 16 in the sense of a reduction of width 21 of maw 18. It is therefore not necessary to use elastically yielding material for mounting bracket 13; rather, relatively stiff or even brittle material can be used.

As FIG. 3 indicates, the cross-sectional profile of mounting bracket 13 is adapted for production by extrusion, so that mounting bracket 13 can be formed using a correspondingly elongated extrusion die. Suitable materials are light metals, especially alloys of aluminum, while the frusto-conical nut 25 is preferably of stainless steel.

The mounting bracket shown permits a wide diameter range for the strut segment 7, which range is limited on the upside by the width of the maw 18 and on the downside by the smallest gap between frusto-conical nut 25 and clamping surface 17 which still permits nut 25 to be supported laterally by the bore 22. When used with a cylindrical strut, very good adjustability is achieved, since the bracket 13 can be fastened at any desired angle. Even with slightly tapered struts, such as fork tube, a reliable attachment is possible.

What is claimed is:

1. Apparatus, for mounting a headlamp on a cycle, particularly a bicycle, having
 a mounting bracket (13) with two ends, one (28) of said ends being coupled to a headlamp housing (9), and the other (14) of said ends adapted for coupling to a cycle strut (7),
 wherein, in accordance with the invention,
 said mounting bracket (13) has, at its end (14) remote from said housing (9), a bight or maw (18) defined by a pair of legs or jaws (15, 16) and a clamping surface (17) extending therebetween;
 an internally threaded clamping element (25) is provided, which in a mounted position is supported by said legs (15, 16) and presses a strut segment (7), disposed between said legs (15, 16), against said clamping surface (17);
 each of said legs (15, 16) has a respective opening (22,23), in one of which openings said clamping element (25) is supported;
 at least one (22) of said openings has sidewalls which are smooth and parallel to one another;
 said clamping element (25) has a wedge-shaped surface, is disposed in said at least one smooth-walled opening (22), and can be adjusted, by means of a screw (24) introduced through the other (23) of said openings, toward the leg (16) in which said other opening (23) is formed, thereby exerting on said strut (7) a pressing force in a direction substantially perpendicular to the axis of said screw (24) and clamping said strut (7) between said wedge-shaped surface and said clamping surface (17) without tensioning or bending said legs (15, 16) toward one another.

2. The mounting apparatus of claim 1, wherein said bight (18) has a U-shaped cross-section.

3. The mounting apparatus of claim 1, wherein
said legs (15, 16) are formed, on their respective opposing inner faces, with generally flat surfaces (19, 20) and
said clamping surface (17) has a half-cylindrical configuration.

4. The mounting apparatus of claim 1, wherein
said legs (15, 16) are formed, on their respective opposing inner faces, with generally flat surfaces (19, 20) and
said clamping surface (17) has a polygonal configuration.

5. The mounting apparatus of claim 1, wherein
the breadth of said bight (18), in a direction perpendicular to the major axis of each of said legs (15, 16), is greater than its width (21), measured between said legs.

6. The mounting apparatus of claim 1, wherein
said wedge-shaped surface is the leading surface of a frusto-conical clamping element (25), said element having a cylindrical extension (26) of the same diameter and a concentric threaded hole (27) which serves to receive said screw (24).

7. The mounting apparatus of claim 1, wherein
the cross-section of said smooth-walled opening (22) corresponds to the cross-section of the clamping element (25) disposed therein.

8. The mounting apparatus of claim 1, wherein
said mounting bracket (13) is an extruded element.

9. The mounting apparatus of claim 1, wherein
the material of said mounting bracket is aluminum.

10. The mounting apparatus of claim 1, wherein
the material of said clamping element is stainless steel.

11. The mounting apparatus of claim 1, wherein
said mounting bracket has, in its end adjacent to said housing (9), two orthogonally disposed holes (29, 31), one of which, selectively, receives a bolt (12);
each of said holes is surrounded by a respective abutment surface (32, 33); and
a joint bar (11) is provided, extending from said housing (9), said bolt serving to fasten said mounting bracket (13) and said joint bar (11) together.

* * * * *